(12) United States Patent
Ohrlander (10) Patent No.: US 10,039,304 B2
(45) Date of Patent: Aug. 7, 2018

(54) SYSTEM AND METHOD FOR ADJUSTING AIR FLOW IN SPIRAL CONVEYERS

(71) Applicant: John Bean Technologies AB, Helsingborg (SE)

(72) Inventor: Lars Axel Herman Ohrlander, Helsingborg (SE)

(73) Assignee: John Bean Technologies AB, Helsingborg (SE)

( * ) Notice: Subject to any disclaimer, the term of this patent is extended or adjusted under 35 U.S.C. 154(b) by 445 days.

(21) Appl. No.: 14/705,851

(22) Filed: May 6, 2015

(65) Prior Publication Data
US 2016/0324194 A1    Nov. 10, 2016

(51) Int. Cl.
*F24F 7/00* (2006.01)
*A23L 3/00* (2006.01)
*A23L 3/36* (2006.01)

(52) U.S. Cl.
CPC .............. *A23L 3/001* (2013.01); *A23L 3/361* (2013.01); *A23V 2002/00* (2013.01)

(58) Field of Classification Search
CPC ...... A23L 3/001; A23L 3/361; A23V 2002/00
USPC ............ 454/333; 62/381; 198/778; 126/21 A
See application file for complete search history.

(56) References Cited

U.S. PATENT DOCUMENTS

| | | | |
|---|---|---|---|
| 2,126,285 A * | 8/1938 | Schaaf | F25D 21/002 62/156 |
| 3,691,644 A | 9/1972 | Schnitzer | |
| 3,938,651 A | 2/1976 | Alfred et al. | |
| 4,177,647 A | 12/1979 | Overbye | |
| 4,480,535 A | 11/1984 | Jaxmar et al. | |
| 4,612,780 A | 9/1986 | Briley et al. | |
| 4,726,766 A | 2/1988 | Stewart et al. | |
| 5,214,934 A | 1/1993 | Palframan et al. | |
| 5,205,135 A * | 4/1993 | Lang | A23L 3/361 62/381 |
| 5,335,590 A | 8/1994 | Crump, III et al. | |
| 5,398,521 A | 3/1995 | Baron et al. | |
| 5,515,775 A | 5/1996 | Crump, III et al. | |
| 5,803,232 A | 9/1998 | Fröderberg | |
| 8,415,592 B2 | 4/2013 | Kuenen | |
| 8,646,383 B1 | 2/2014 | Howard | |

(Continued)

FOREIGN PATENT DOCUMENTS

| | | |
|---|---|---|
| AU | 2012/225317 A1 | 9/2013 |
| EP | 2 135 509 A1 | 12/2009 |

(Continued)

OTHER PUBLICATIONS

U.K. Intellectual Property Office Search Report Under Section 17(5), dated Dec. 8, 2016, issued in corresponding Great Britain Application No. GB 1607833.9, filed May 5, 2016, 3 pages.

*Primary Examiner* — Vivek Shirsat
(74) *Attorney, Agent, or Firm* — Christensen O'Connor Johnson Kindness PLLC (57) ABSTRACT

An adjustable flow path modification assembly for use with a gas treatment system having a spiral stack and a gas treatment supply unit disposed within a chamber, wherein the spiral stack has a height and an inner channel, includes a first internal partition disposed within the inner channel of the stack and an adjustable opening defined within the first internal partition. The adjustable opening is configured to selectively allow the flow of treatment gas through the inner channel of the stack.

20 Claims, 8 Drawing Sheets

(56) References Cited

U.S. PATENT DOCUMENTS

| | | |
|---|---|---|
| 8,753,703 B2 | 7/2014 | Gunawardena et al. |
| 2009/0181138 A1 | 7/2009 | Howard |
| 2012/0148719 A1 | 6/2012 | Howard |
| 2012/0318254 A1 | 12/2012 | Howard |
| 2013/0133637 A1 | 5/2013 | McVeagh et al. |
| 2014/0120220 A1 | 5/2014 | Howard et al. |

FOREIGN PATENT DOCUMENTS

| | | |
|---|---|---|
| EP | 2 672 829 A1 | 9/2012 |
| EP | 2 230 922 B1 | 12/2012 |
| EP | 2 740 361 A2 | 12/2013 |
| WO | 97/24569 A1 | 7/1997 |
| WO | 2012/122491 A1 | 9/2012 |

\* cited by examiner

SYSTEM AND METHOD FOR ADJUSTING AIR FLOW IN SPIRAL CONVEYERS

BACKGROUND

Self-stacking spiral conveyors employ a pervious conveyor belt for conveying products in a spiral or helical path through a cooking, drying, cooling, or freezing chamber. A heat transfer system and other applicable systems provide the appropriate gas treatment within the chamber for cooking, drying, cooling, or freezing products. These spiral stacks or conveyors generally have space efficiency in that they have a small footprint while providing a relatively long processing path. However, it is often a challenge to direct the flow of treatment gas within the chamber to evenly and completely cook, dry, freeze, or refrigerate the products.

In a typical spiral stack, treatment gas is directed vertically downward or upward within the stack. Such a vertical flow pattern often causes uneven temperatures within the stack because the products are more densely packed on the interior side of the conveyor belt. A crowded configuration results because the products are loaded evenly on a linear portion of the conveyor belt at the entry of the freezer system, and the belt collapses on the interior portion (or expands on the exterior portion) when the belt changes to a circular shape as it enters the spiral path of the stack. The products on the interior portion of the conveyor belt are moved closer together, and/or the products on the exterior portion of the conveyor belt are moved farther apart from one another, resulting in an uneven distribution of products on the conveyor belt.

With substantially vertical airflow through the stack, the products on the interior portion of the conveyor belt will not be treated to the same degree as the products on the exterior portion of the conveyor belt. In a specific example of a spiral freezer, the products on the interior portion of the conveyor belt will not be frozen to the same degree as the products on the exterior portion of the conveyor belt for at least two reasons. First, heat from the crowded products increases the temperature of the treatment gas on the interior portion of the stack as the gas passes vertically over the products. Thus, the products on the interior portion of the belt are exposed to warmer treatment gas for heat exchange. Second, the more densely packed products on the interior portion of the belt restrict the vertical flow of the treatment gas. Therefore, the products on the interior portion of the belt are also not exposed to a sufficient amount of treatment gas for heat exchange.

An existing solution to this problem is to perforate the inner side links of the conveyor belt to allow gas to flow radially across the stack while positioning a horizontal partition or sheeting within the interior of the stack to direct radial flow. Moreover, in a vertical downward flow system, the internal sheeting is positioned lower than an outer mezzanine extending between an exterior of the stack and an interior of the freezer chamber (and the internal sheeting is positioned above an outer mezzanine in a vertical upward flow system). As a result, a more continuous flow of colder treatment gas (substantially unaffected by product heat) is directed radially through the inner side links of the belt and across the stack. This configuration is described in more detail below with reference to the prior art system depicted in FIG. 1.

A drawback to the above-described solution is that the vertical position of the internal sheeting is fixed, and the position is not always optimal for every freezer system. For instance, the optimal placement of the internal sheeting may depend on the type of product to be frozen, the variables of the treatment gas (type, velocity, temperature, moisture content, etc.), the direction of vertical flow, or other variables. Calculations could be made to predict the optimal placement for the internal sheeting, however, such calculations are time consuming, inaccurate, and dependent on many variables. The internal sheeting could also be made adjustable in height, however, such a solution is mechanically difficult to implement and expensive.

Moreover, even with optimal placement of the internal sheeting, uneven treatment of the products may result. The above-described solution increases air flow to the interior of the stack, however, the increased air flow may be insufficient. As a result, the products positioned on the interior portion of the conveyor belt may be warmer than the products on the exterior portion of the belt. If the products are arranged in rows across the belt, and the products are mixed when packed, the uneven temperature of the products may even out when the mixed products are packed together. However, if the products are instead packed by rows, the packed products from a row on the interior portion of the belt may be too warm and inadequately frozen. Likewise, packed products from a row on the exterior portion of the belt may be too cold, possibly resulting in a brittle product that could break during packaging.

In a converse example, the above-described solution may actually overcompensate and cause excessive air to flow through the interior of the stack. As a result, products on the exterior portion of the conveyor belt are warmer compared to the products on the interior portion of the belt. If the products are packed by rows, the packed products from a row on the exterior portion of the belt may be too warm, and packed products from a row on the interior portion of the belt may be too cold.

Other possible alternative solutions include loading products less densely on the interior side of the belt (or more densely on the exterior side) at the entry of the freezer system such that the products are more evenly distributed when the belt collapses on the interior portion (or expands on the exterior portion). However, loading the products onto the belt in this manner is difficult to manage, inconsistent, and it may decrease the output capacity of the spiral stack. As yet another alternative, the degree of perforation in the inner side links of the conveyor belt may be adjusted or optimized for every freezer system. However, such a solution is unrealistic and cost prohibitive.

Thus, there exists a need for a gas circulation system for a self-stacking spiral conveyor that can be adjusted to create optimal gas flow treatment for a specific product and that improves treatment results and maintains output product yield from the system.

SUMMARY

An adjustable flow path modification assembly for use with a gas treatment system having a spiral stack and a gas treatment supply unit disposed within a chamber, wherein the spiral stack has a height and an inner channel, includes a first internal partition disposed within the inner channel of the stack, and an adjustable opening defined within the first internal partition. The adjustable opening is configured to selectively allow the flow of treatment gas through the inner channel of the stack.

In one aspect, the adjustable flow path modification assembly includes an external partition fitted between the spiral stack and the chamber.

In another embodiment, a gas treatment system includes a spiral stack disposed within a chamber, wherein the spiral stack has a height and an inner channel. The gas treatment system further includes a gas treatment supply unit configured to circulate treatment gas to the spiral stack in the chamber, and an adjustable flow path modification assembly. The adjustable flow path modification assembly includes a first internal partition disposed within the inner channel of the stack an adjustable opening defined within the first internal partition. The adjustable opening is configured to selectively allow the flow of treatment gas through the inner channel of the stack.

In one aspect of the gas treatment system, the through-hole is selectively covered by one of a partition piece, a valve, a vent, a door, and any combination thereof.

In another aspect of the gas treatment system, the adjustable opening is defined by a fan defined in the first internal partition.

In yet another aspect of the gas treatment system, the gas treatment system is defined as a freezer system.

In another embodiment, a method of adjusting the flow of treatment gas within a gas treatment system is provided. The gas treatment system includes a spiral stack and a gas treatment supply unit disposed within a chamber, and the spiral stack has a height and an inner channel. The method includes providing an adjustable flow path modification assembly. The adjustable flow path modification assembly includes a first internal partition disposed within the inner channel of the stack and an adjustable opening defined within the first internal partition. The method further includes reducing the flow of treatment gas through the adjustable opening to direct the flow of treatment gas radially across a portion of the stack, and increasing the flow of treatment gas through the adjustable opening to allow the flow of treatment gas through the inner channel of the stack.

The method may further include reducing the flow of treatment gas through the adjustable opening by selectively covering at least a portion of a through-hole defined in the first internal partition.

The method may further include selectively covering the through-hole by one of a partition piece, a valve, a vent, a door, and any combination thereof.

The method may further include increasing the flow of treatment gas through the adjustable opening by uncovering at least a portion of a through-hole defined in the first internal partition.

The method may further include providing an external partition fitted between the spiral stack and the chamber at a height of the stack below the first internal partition.

The method may further include providing a second internal partition disposed within the inner channel, wherein the second internal partition is at a height of the stack below the first internal partition.

The method may further include directing gas treatment from the gas treatment supply unit toward a top of the spiral stack.

The method may further include defining the adjustable opening by a fan.

The method may further include providing a plurality of openings defined within the first internal partition, wherein each of the plurality of openings may be configured to selectively allow the flow of treatment gas through the inner channel of the stack.

The method may further include defining the gas treatment system as a freezer system.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Embodiments of the present disclosure are directed to systems and methods for achieving adjustable flow of treatment gas in a self-stacking spiral conveyor system. The systems and methods described herein can be used to optimize the configuration of a self-stacking spiral conveyor system within a freezer chamber (hereinafter a "spiral freezer system"). In that regard, specific freezer configurations may be suitable for different products and for different freezing methods. These specific optimized configurations can be achieved by adjusting flow direction, temperature, humidity, velocity, and vector direction and magnitude inside the freezer system. Optimization of the freezer configuration not only improves output product yield and profitability for the system, but also improves the quality of the output product. It should be appreciated that the systems and methods described herein may be employed with any suitable system, such as a spiral dryer, oven, or refrigeration system.

Moreover, although shown and described in combination, it should be appreciated that a freezer system in accordance with embodiments of the present disclosure need not include a spiral stack, as described herein. In that regard, the gas circulation system may be combined with other respective belt assemblies, such as a linear belt conveyor system.

A suitable treatment gas in accordance with embodiments of the present disclosure may be an air and vapor mixture at a predefined operating temperature and velocity. Therefore, the terms "treatment gas," "supply gas," "return gas," "gas," and "air" may be used interchangeably throughout the present disclosure. However, it should be appreciated that any suitable treatment gas may be used; and therefore, the description and illustrations herein should not be seen as limiting the scope of the claimed subject matter.

Figure 1:
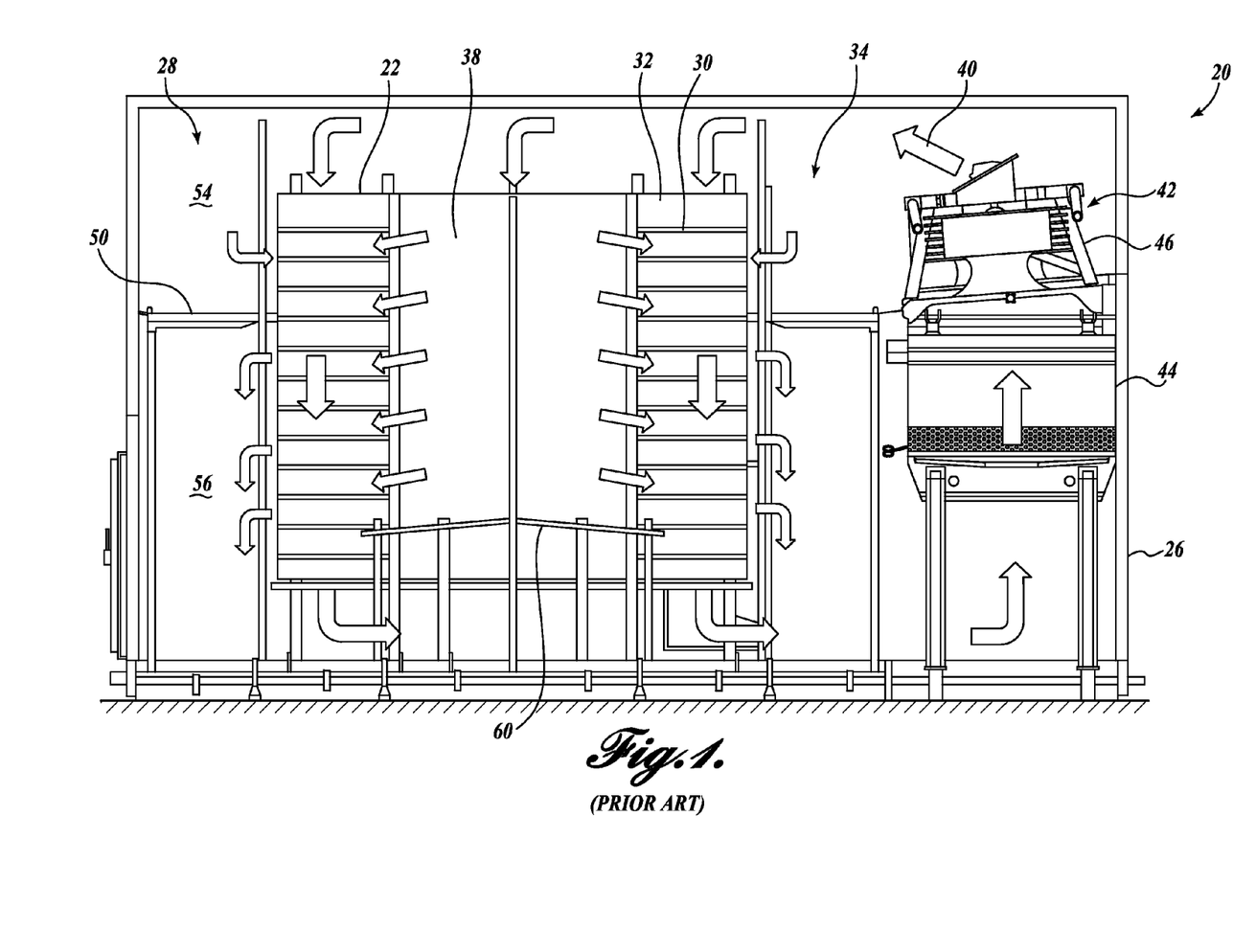
FIG. 1 is a cross-sectional view of a freezer system including a spiral stack in a freezer chamber and a gas circulation system with a prior art flow path modification assembly for the freezer chamber, wherein a typical gas flow pattern within the freezer chamber is depicted.

Referring to FIG. 1, an exemplary spiral freezer system 20 having a gas circulation system 34 with a prior art flow path modification assembly 28 is depicted. FIGS. 2-8 depicts spiral freezer systems 200-800, respectively, having a gas circulation system with an adjustable flow path modification assembly formed in accordance with an exemplary embodiment of the present disclosure. Numerous elements of the spiral freezer systems 20 and 200-800 are identical, and in this regard, identical parts are identified by the same reference numeral for ease of reference. A detailed description of the spiral freezer system 20 will be hereinafter provided with reference to FIG. 1. Accordingly, it should be appreciated that such description also refers to the identical elements shown in FIGS. 2-8. Identical elements shown in FIGS. 2-8 will therefore not be separately described.

The spiral freezer system 20 includes a spiral stack 22 contained within an insulated freezer chamber 26. The spiral stack 22 is formed from a pervious conveyor belt 30 that supports and transports products within the freezer chamber 26. The conveyor belt 30 moves in both linear and spiral patterns within the spiral freezer system 20. More specifically, the conveyor belt 30 moves in a linear pattern at the entry and exit portals (not shown) of the spiral stack 22, and the conveyor belt 30 moves in a spiral or helical path within the spiral stack 22. The conveyor belt 30 moves products within the spiral stack 22 in an ascending or descending spiral or helical path as is well known in the art.

The conveyor belt 30, when formed as a spiral stack 22, is configured into a plurality of tiers 32 that are stacked on top of one another (i.e., known in the art as a "self-stacking" conveyor belt). Each tier 32 of the stack 22 forms a pervious annulus through which gas may flow. When formed in a spiral stack 22, the plurality of tiers 32 creates an inner cylindrical channel 38, through which the treatment gas may also travel. Products (not shown) travel on the conveyor belt 30 and are frozen by treatment gas 40 in the freezer chamber 26. Exemplary spiral stacks 22 may have any number of tiers 32, typically in the range of about 8 to about 25 tiers.

Suitable embodiments of spiral stacking belts are shown and described in U.S. Pat. No. 3,938,651, issued to Alfred et al., and U.S. Pat. No. 5,803,232, issued to Frodeberg, the disclosures of which are hereby expressly incorporated by reference. However, it should be appreciated that other suitable spiral belt assemblies are also within the scope of the present disclosure.

The gas circulation system 34 includes a gas treatment supply unit embodied as freezer unit 42 for supplying refrigerated treatment gas 40 to food products within the spiral stack 22, and a prior art flow path modification assembly 28 for directing the flow of the treatment gas 40 within the freezer chamber 26. The freezer unit 42 includes an evaporator 44, at least one fan 46, and other necessary components, such as a compressor, condenser, etc. (not shown), for supplying suitable treatment gas 40 for heat exchange with the products, as is well known in the art.

The freezer unit 42, through fan 46, is configured to direct the treatment gas 40 toward the top of the spiral stack 22 for eventual downward, vertical flow through the stack 22. In that regard, the fan 42 directs treatment gas 40 horizontally across the top of the stack 22 to become predominantly vertical downward flow within the stack. The freezer chamber 26 may include contoured walls to help direct the treatment gas 40 toward the top of the stack 22. It should be appreciated that the freezer unit 42 may instead direct the treatment gas 40 toward the bottom of the stack to become predominantly vertical upward flow in a different configuration.

Moreover, it should be appreciated that the freezer unit 42 may instead be located within the freezer chamber 26 such that the fan 42 directs the treatment gas 40 directly downwardly (or upwardly) into the stack 22. After exiting the stack 22, the treatment gas 40 (or return gas, after exiting the stack 22) is drawn by the suction of fan 46 (or another fan) for heat exchange and continuous recirculation within the freezer chamber 26.

The prior art flow path modification assembly 28 helps direct the flow of treatment gas 40 within the spiral stack 22 and freezer chamber 26. The directional arrows in FIG. 1 depict the flow pattern of the treatment gas 40 through the spiral stack 22 and freezer chamber 26.

The prior art flow path modification assembly 28 includes an external horizontal partition or mezzanine 50 located outside of the stack 22 and a lower internal horizontal partition or sheeting 60 fitted within in the inner cylindrical channel 38 of the stack 22. The external mezzanine 50 and lower internal sheeting 60 help direct the downward flow of treatment gas 40 radially across the width of at least some of the tiers 32 of the stack 22 to define a "cross-flow" path. The cross-flow path is channeled through any links, openings, etc., in the stacked tiers 32 between the inner cylindrical channel 38 of the stack 22 and the exterior of the stack 22.

The external mezzanine 50 is fitted horizontally between the exterior of the spiral stack 22 (in the depicted embodiment, at about two-thirds (⅔) of the height of the spiral stack 22) and the interior of the freezer chamber 26. In this manner, the external mezzanine 50 essentially divides the freezer chamber 26 into atmospheric zones. More specifically, a first, higher pressure atmospheric zone 54 is defined above the external mezzanine 50, and a second, lower pressure atmospheric zone 56 is defined below the external mezzanine 50.

The pressure drop between the first and second atmospheric zones 54 and 56 directs the treatment gas 40 radially inwardly and downwardly across the stack 22 above the external mezzanine 50, and radially outwardly and downwardly across the stack 22 below the external mezzanine 50. In that regard, the treatment gas 40 flows from areas of high pressure in the first atmospheric zone 54 to areas of low pressure in the second atmospheric zone 58.

In addition, the lower internal sheeting 60, positioned at a height of the stack 22 below the external mezzanine 50, blocks the downward vertical flow of treatment gas 40 inside the inner cylindrical channel 38 of the spiral stack 22. As such, the lower internal sheeting 60 fitted within the inner cylindrical channel 38 directs the substantially downward, vertical flow radially outwardly across the stack 22.

It should be appreciated that in a vertical upward flow configuration, the lower internal sheeting 60 would be positioned at a height of the stack 22 above the external mezzanine 50, thereby blocking the upward vertical flow of treatment gas 40 inside the inner cylindrical channel 38 of the spiral stack 22. Such a configuration can be visualized by inverting FIG. 1.

With regards to the depicted configuration, the differential pressure prevalent at lower elevations of the stack 22 in combination with the channeling effect of the lower internal sheeting 60 helps create a beneficial cross flow pattern of the treatment gas 40 across the stack 22. More specifically, continuous flow of treatment gas 40 radially across the stack 22 reduces the temperature rise of treatment gas 40 on the interior, product dense side of the stack 22. Moreover, the cross flow is not substantially impeded by the densely packed products that would otherwise restrict vertical downward flow through the stack 22.

However, as noted in the Background section above, the prior art flow path modification assembly 28 is a fixed solution, and the position of the external mezzanine 50 and lower internal sheeting 60 is not always optimal for every freezer system. For instance, the optimal placement of the external mezzanine 50 and lower internal sheeting 60 may depend on the type of product to be frozen, the variables of the treatment gas (type, velocity, temperature, moisture content, etc.), or other variables. Calculations could be made to predict the optimal placement for the external mezzanine and/or internal sheeting, however, such calculations are time consuming, inaccurate, and dependent on many variables. Moreover, even with optimal placement of the external mezzanine and/or internal sheeting, uneven treatment of products may still result.

Figure 2:
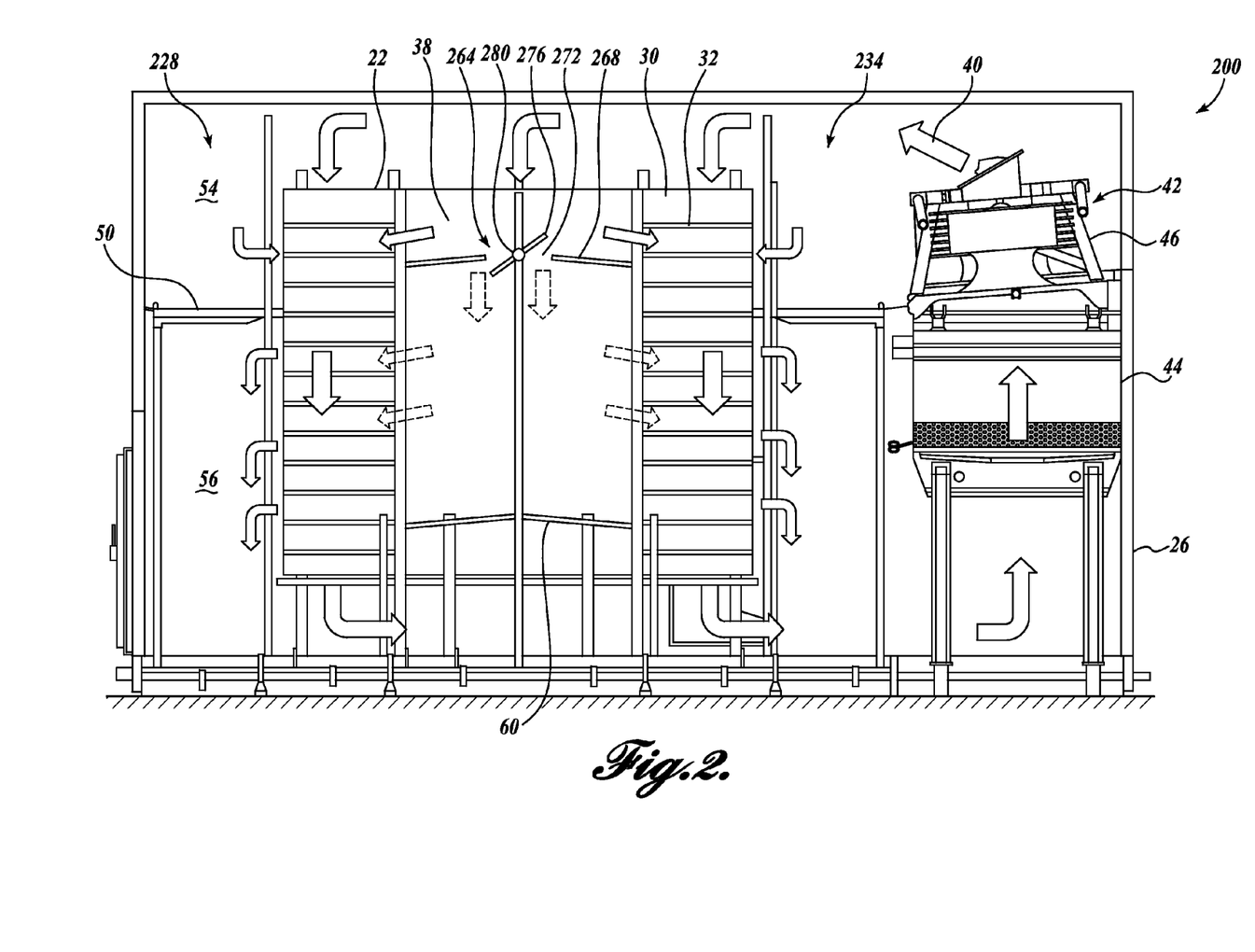
FIG. 2 is a cross-sectional view of a freezer system including a spiral stack in a freezer chamber and a gas circulation system having an adjustable flow path modification assembly for the freezer chamber formed in accordance with a first exemplary embodiment of the present disclosure, wherein a typical gas flow pattern within the freezer chamber is depicted.

Referring to FIG. 2, a first exemplary embodiment of a spiral freezer system 200 having a gas circulation system 234 configured to selectively adjusting the flow of treatment gas 40 through the stack 22 will now be described. As discussed above, numerous elements of the spiral freezer systems 20 and 200 are identical, and in this regard, only the gas circulation system 234, and its beneficial effects on the flow of treatment gas 40 within the freezer system 200, will be described.

The gas circulation system 234 of the spiral freezer system 200 includes a gas treatment supply unit embodied as a freezer unit 42 (as described above with reference to FIG. 1), and an adjustable flow path modification assembly 228 for supplying and circulating refrigerated treatment gas 40 to food products within the spiral stack 22. The adjustable flow path modification assembly 228 may include an external mezzanine 50 and lower internal sheeting 60 for providing the cross-flow benefits described above with reference to FIG. 1. To reiterate, the external mezzanine 50 and lower internal sheeting 60 help direct the downward vertical flow of treatment gas 40 in a substantially horizontal radial path (or "cross-flow" path) across the width of at least some of the tiers 32 of the stack 22.

The cross-flow path is channeled through any links, openings, etc., in the stacked tiers 32 between the inner cylindrical channel 38 of the stack 22 and the exterior of the stack 22. However, as noted above, the external mezzanine 50 and lower internal sheeting 60 are fixed; and therefore, the flow pattern of the freezer system 28 depicted in FIG. 1 cannot be adjusted to optimize the freezer configuration. Moreover, even if adjustable in position, the external mezzanine 50 and lower internal sheeting 60 do not always produce even treatment of products on the conveyor belt 30.

In addition or in lieu of the external mezzanine 50 and lower internal sheeting 60, the adjustable flow path modification assembly 228 includes an upper internal sheeting assembly 264 suitable for optimizing the freezer configuration. The upper internal sheeting assembly 264 is defined in part by an upper internal horizontal partition or sheeting 268 fitted within the inner cylindrical channel 38 of the stack 22.

The upper internal sheeting 268 is positioned at a height above the external mezzanine 50 to at least partially block the vertical downward flow of treatment gas 40 inside the inner cylindrical channel 38 at a top portion of the spiral stack 22. In this manner, the upper internal sheeting 268 directs the substantially vertical downward flow of treatment gas 40 radially outwardly across the top portion of stack 22. It should be appreciated, however, that the vertical position of the upper internal sheeting 268 may instead be equal in height or lower than the outer mezzanine 50. Moreover, it should be appreciated that in a vertical upward flow configuration, the lower internal sheeting 60 would be positioned at a height of the stack 22 above the external mezzanine 50, and the upper internal sheeting assembly 268 would be positioned at a height of the stack 22 below the external mezzanine 50. Such a configuration can be visualized by inverting FIG. 2.

The upper internal sheeting assembly 264 may further include one or more adjustable openings 272 within the upper internal sheeting 268 for selectively allowing treatment gas 40 to flow vertically downward through the inner cylindrical channel 38 of the stack 22. In the embodiment of FIG. 2, a substantially central adjustable opening 272 is disposed within the upper internal sheeting 268. The adjustable opening 272 is defined by a through hole (not labeled) in the upper internal sheeting assembly 264 that is selectively coverable by a moveable sheeting section 276. The moveable sheeting section 276 may be selectively moved, adjusted, rotated, etc., to partially or fully reveal the adjustable opening 272 for allowing treatment gas 40 to flow vertically therethrough.

In the depicted embodiment, the moveable sheeting section 276 may be selectively rotated about a central point or axis by a suitable movement assembly 280 to at least partially reveal or cover the through-hole. Any suitable movement assembly 280 may be used, such as a rotating damper, a disc belt, a pulley system, etc. The movement assembly 280 may be selectively actuated by any suitable remote or integrated, automatic or manual actuation assembly (not shown), such as an electronic, pneumatic, or hydraulic assembly, a manual lever or knob, etc., or any combination thereof.

The moveable sheeting section 276 is selectively rotated to partially or fully reveal the through-hole of the adjustable opening 272 for allowing treatment gas 40 to flow vertically therethrough. In that regard, the directional arrows in FIG. 2 depict the flow pattern of the treatment gas 40 through the spiral stack 22 and freezer chamber 26 with the through-hole of the adjustable opening 272 at least partially revealed. The upper internal sheeting 268 partially blocks the downward vertical flow of treatment gas 40 inside the inner cylindrical channel 38 of the spiral stack 22. As such, the flow of treatment gas 40 is directed radially across a top portion of the stack 22 (above the upper internal sheeting 268). However, the at least partially revealed through-hole of the adjustable opening 272 allows a limited amount of treatment gas 40 to flow vertically downward within the stack 22.

The flow pattern of the treatment gas 40 depicted in FIG. 2 may be selectively adjusted to optimize the freezer system 200 for different configurations and uses. For instance, the optimal flow pattern may depend on the type of product to be frozen, the variables of the treatment gas (type, velocity, temperature, moisture content, etc.), or other variables. To optimize the freezer system 200 for a particular use, the through-hole of the adjustable opening 272 may be closed or partially closed (by the moveable sheeting section 276) to increase the radial flow of treatment gas 40 across the upper portion of the stack 22 and decrease the flow of treatment gas 40 within the inner cylindrical channel 38 of the stack 22. Such a configuration may be desired if, as noted in the Background section above, the products on the exterior portion of the conveyor belt 30 are warmer than the products on the interior portion of the belt 30. With treatment gas 40 flowing across the upper portion of the stack 22, an increased flow of colder gas (substantially unaffected by product heat on the interior portion of the conveyor belt 30) reaches the products on the exterior portion of the conveyor belt 30.

To optimize the flow of treatment gas 40, the through-hole of the adjustable opening 272 may be opened or partially opened to allow at least some vertical, downward flow through the inner cylindrical channel 38 of the stack 22 and to decrease the radial flow of treatment gas 40 across the upper portion of the stack 22.

Moreover, the optimal size, shape, placement, and quantity of adjustable openings may be varied. For instance, a plurality of adjustable openings may be defined within the upper internal sheeting 268. Each of the plurality of openings may be equal or different in size and/or shape, symmetrically or asymmetrically positioned within the upper internal sheeting 268, or any other suitable variation, to optimize the flow of treatment gas 40.

The through-hole of the adjustable opening(s) in the upper internal sheeting may be selectively opened and closed through any suitable structure. In that regard, exemplary alternative embodiments of suitable upper internal sheeting assemblies having various adjustable opening configurations will now be described with reference to FIGS. 3-8.

It should be appreciated that the freezer systems described with reference to FIGS. 3-8 are substantially identical to the freezer system 200 described above with the exception of the upper internal sheeting assemblies. Accordingly, only the upper internal sheeting assemblies will be described in detail.

Moreover, the freezer systems of FIGS. 3-8 are described and illustrated in reference to a vertical downward flow configuration having a lower internal sheeting 60 positioned at a height of the stack 22 below the external mezzanine 50 (with the external mezzanine 50 below the upper internal sheeting assembly). However, it should be appreciated that in a vertical upward flow configuration, the lower internal sheeting 60 would be positioned at a height of the stack 22 above the external mezzanine 50, and the upper internal sheeting assembly would be positioned at a height of the stack 22 below the external mezzanine 50. Such a configuration can be visualized by inverting FIGS. 3-8.

Figure 3:
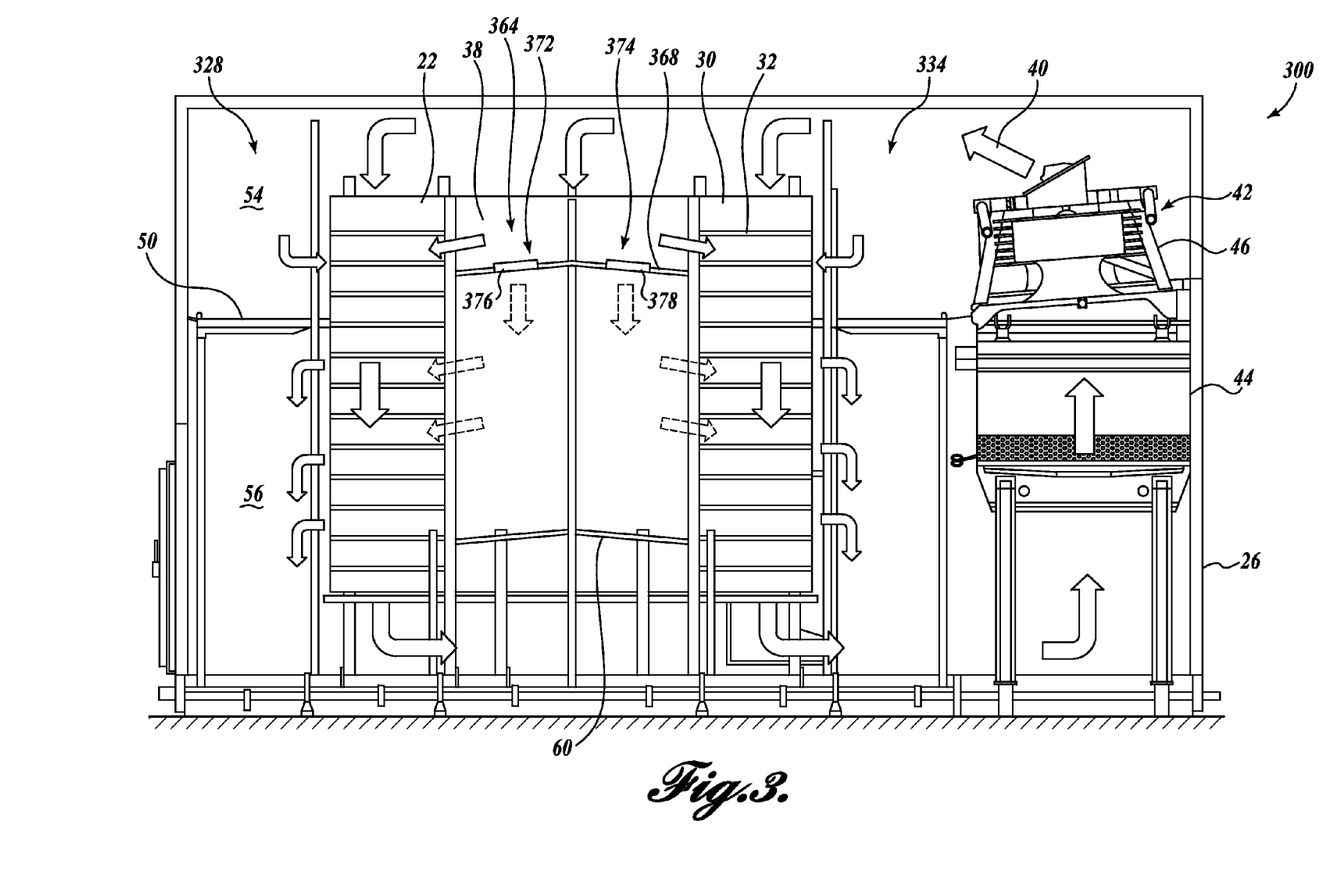
FIG. 3 is a cross-sectional view of a freezer system including a spiral stack in a freezer chamber and a gas circulation system having an adjustable flow path modification assembly for the freezer chamber formed in accordance with a second exemplary embodiment of the present disclosure, wherein a typical gas flow pattern within the freezer chamber is depicted.

Referring to FIG. 3, a freezer system 300 includes a gas circulation system 334 with an adjustable flow path modification assembly 328 defined in part by an upper internal sheeting assembly 364. The upper internal sheeting assembly 364 includes first and second adjustable openings 372 and 374 defined in part by first and second through-holes (not labeled) within an upper internal sheeting 368. The first and second adjustable openings 372 and 374 are substantially similar in size, shape, and configuration, although the size, shape, and configuration may be varied to optimize the freezer configuration.

The first and second adjustable openings 372 and 374 are also symmetrically defined on first and second portions of the upper internal sheeting 368 (about a center of the substantially circular sheeting 368), although the pattern of adjustable openings may also be varied for optimization. In that regard, third and fourth adjustable openings (not shown) may be defined on third and fourth portions of the upper internal sheeting 368.

The adjustable openings 372 and 374 further include first and second removable sheeting pieces 376 and 378, respectively, for selectively covering the through-holes in the upper internal sheeting 368. The sheeting pieces 376 and 378 may be removably secured in the upper internal sheeting 368 in any suitable manner, such as by friction fit, snap-fit technology, a fastening assembly, etc. Moreover, the sheeting pieces 376 and 378 may be securable in a closed, covered position by a lock or other suitable mechanism (not shown).

One or both of the through-holes of the adjustable openings 372 and 374 may be covered by the sheeting pieces 376 and 378, respectively, to increase the radial flow of treatment gas 40 across the upper portion of the stack 22 (and decrease the vertical downward flow through the inner cylindrical channel 38). As stated above with respect to FIG. 2, such a configuration may be desired if the products on the exterior portion of the conveyor belt 30 are warmer than the products on the interior portion of the belt 30. Moreover, to optimize the flow of treatment gas 40, one or both of the sheeting pieces 376 and 378 may be removed to allow at least some vertical downward flow of treatment gas 40 through the inner cylindrical channel 38 and to decrease the radial flow of treatment gas 40 across the upper portion of the stack 22.

Figure 4:
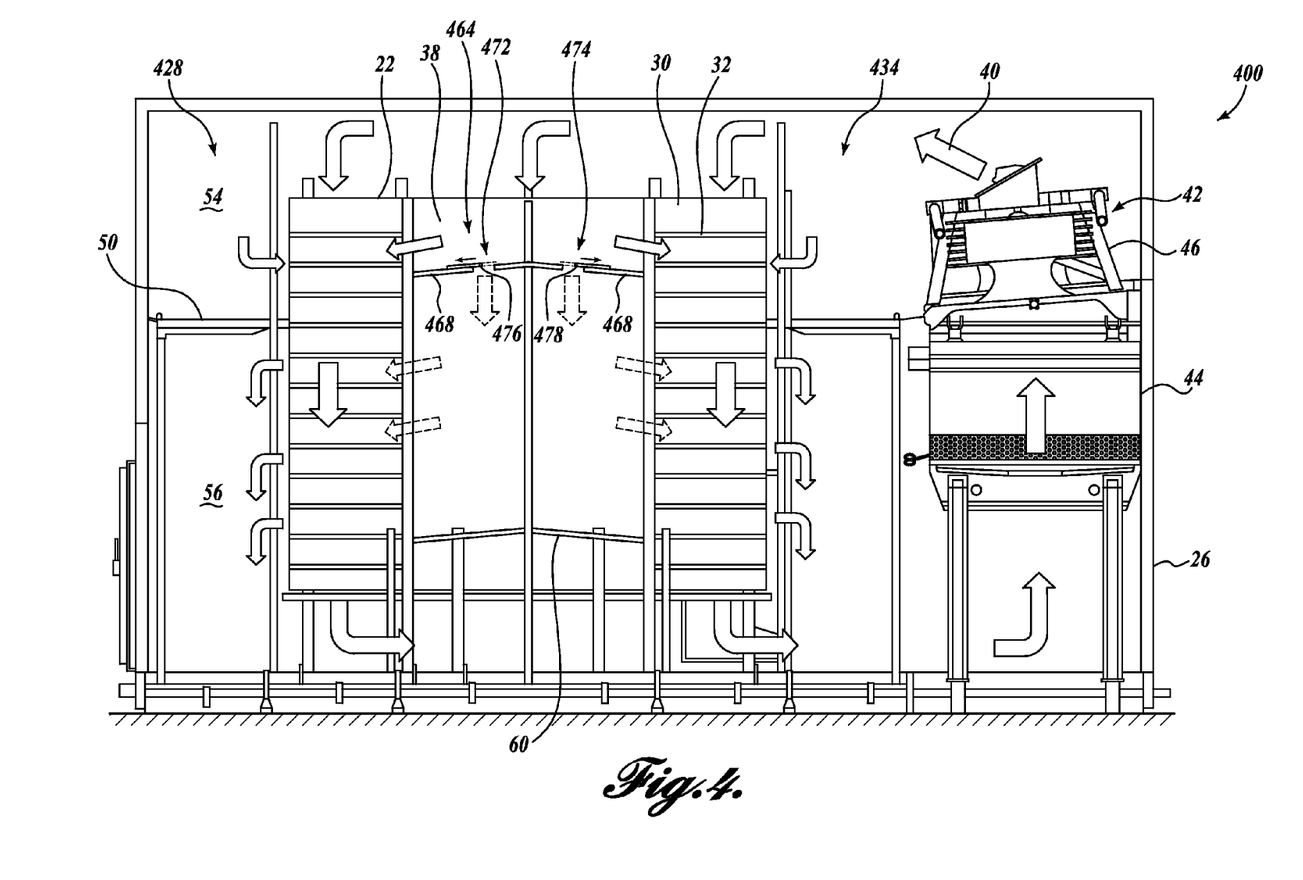
FIG. 4 is a cross-sectional view of a freezer system including a spiral stack in a freezer chamber and a gas circulation system having an adjustable flow path modification assembly for the freezer chamber formed in accordance with a third exemplary embodiment of the present disclosure, wherein a typical gas flow pattern within the freezer chamber is depicted.

Referring to FIG. 4, a freezer system 400 includes a gas circulation system 434 with an adjustable flow path modification assembly 428 defined in part by an upper internal sheeting assembly 464. The upper internal sheeting assembly 464 includes first and second adjustable openings 472 and 474 defined in part by first and second through-holes (not labeled) within an upper internal sheeting 468. Similar to the embodiment shown in FIG. 3, the first and second adjustable openings 472 and 474 are substantially similar in size, shape, and configuration, although the size shape, and configuration, may be varied to optimize the freezer configuration.

The first and second adjustable openings 472 and 474 are also symmetrically defined on first and second portions of the upper internal sheeting 468 (about a center of the substantially circular sheeting 468), although the pattern of openings may also be varied for optimization. In that regard, third and fourth adjustable openings (not shown) may be defined on third and fourth portions of the upper internal sheeting 468.

The adjustable openings 472 and 474 further include first and second sliding valves 476 and 478 for selectively covering the through-holes in the upper internal sheeting 468. The sliding valves 476 and 478 may be configured to at least partially cover or uncover the through-holes in a manner well known in the art. Moreover, the first and second sliding valves 476 and 478 may be biased into a closed position by a biasing member, such as a spring (not shown), and/or securable in a closed position by a lock or other suitable mechanism (not shown). In addition, the first and second sliding valves 476 and 478 may be opened and closed by any suitable means, such as by manual means or by a suitable electrical or electromechanical switch.

Figure 5:
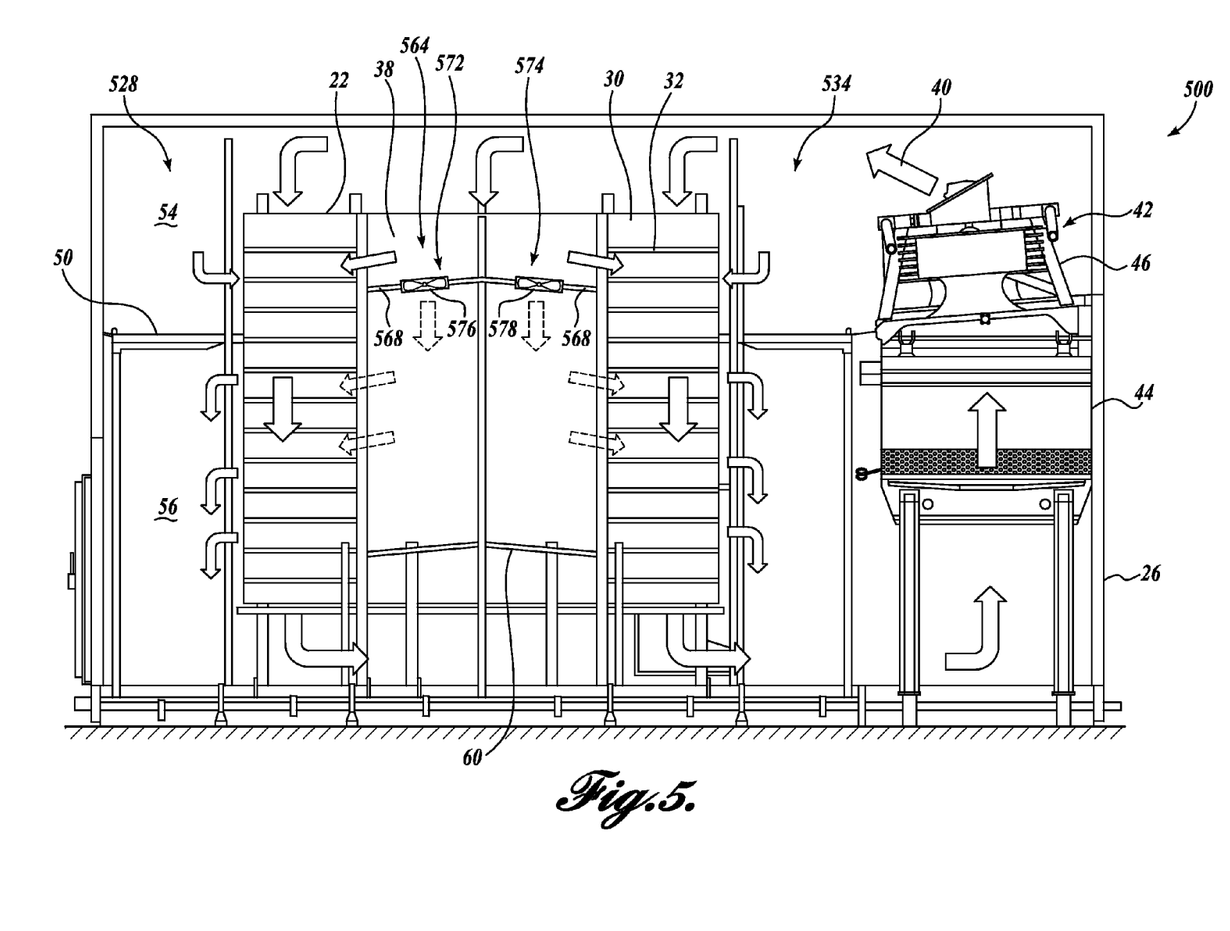
FIG. 5 is a cross-sectional view of a freezer system including a spiral stack in a freezer chamber and a gas circulation system having an adjustable flow path modification assembly for the freezer chamber formed in accordance with a fourth exemplary embodiment of the present disclosure, wherein a typical gas flow pattern within the freezer chamber is depicted.

One or both of the sliding valves 476 and 478 may be closed to increase the radial flow of treatment gas 40 across the upper portion of the stack 22 (and decrease the vertical downward flow through the inner cylindrical channel 38). As stated above with respect to FIG. 2, such a configuration may be desired if the products on the exterior portion of the conveyor belt 30 are warmer than the products on the interior portion of the belt 30. Moreover, to optimize the flow of treatment gas 40, one or both of the sliding valves 476 and 478 may be at least partially opened to allow at least some vertical downward flow of treatment gas 40 through the inner cylindrical channel 38 and to decrease the radial flow of treatment gas 40 across the upper portion of the stack 22. Referring to FIG. 5, a freezer system 500 includes a gas circulation system 534 with an adjustable flow path modification assembly 528 defined in part by an upper internal sheeting assembly 564. The upper internal sheeting assembly 564 includes first and second adjustable openings 572 and 574 defined in part by first and second through-holes (not labeled) within an upper internal sheeting 568. Similar to the embodiment shown in FIG. 3, the first and second adjustable openings 572 and 574 are substantially similar in size, shape, and configuration, although the size, shape, and configuration may be varied to optimize the freezer configuration. The first and second adjustable openings 572 and 574 are also symmetrically defined on first and second portions of the upper internal sheeting 568 (about a center of the substantially circular sheeting 568), although the pattern of openings may also be varied for optimization. In that regard, third and fourth adjustable openings (not shown) may be defined on third and fourth portions of the upper internal sheeting 568.

The adjustable openings 572 and 574 are further defined by first and second variable speed reversible fans 576 and 578 disposed within the first and second through-holes. The fans 576 and 578 may be used to control the velocity and direction of the treatment gas 40 flowing through the upper internal sheeting 568. For instance, one or both of the fans 576 and 578 may be activated in a forward mode to increase the vertical downward flow of the treatment gas 40 through the inner cylindrical channel 38. Such a configuration may be desired if, as noted in the Background section above, the products on the interior portion of the conveyor belt 30 are warmer than the products on the exterior portion of the belt 30, even with perforated side links and optimal positioning of the external mezzanine 50 and lower internal sheeting 60. The speed of one or both of the fans 576 and 578 may also be increased or decreased to adjust the vertical downward velocity of the treatment gas 40 through the inner cylindrical channel 38. In another configuration, one or both of the fans 576 and 578 may be run in a reverse mode to decrease or prevent the vertical downward flow of treatment gas 40 through the inner cylindrical channel 38 (and increase the radial flow of treatment gas 40 across the upper portion of the stack 22). As stated above with respect to FIG. 2, such a configuration may be desired if the products on the exterior portion of the conveyor belt 30 are warmer than the products on the interior portion of the belt 30. While in reverse mode, the speed of one or both of the fans 576 and 578 may also be increased or decreased to adjust the velocity of the treatment gas 40. The first and second fans 576 and 578 may be activated and controlled by any suitable electrical or electromechanical switch (not shown) well known in the art.

Figure 6:
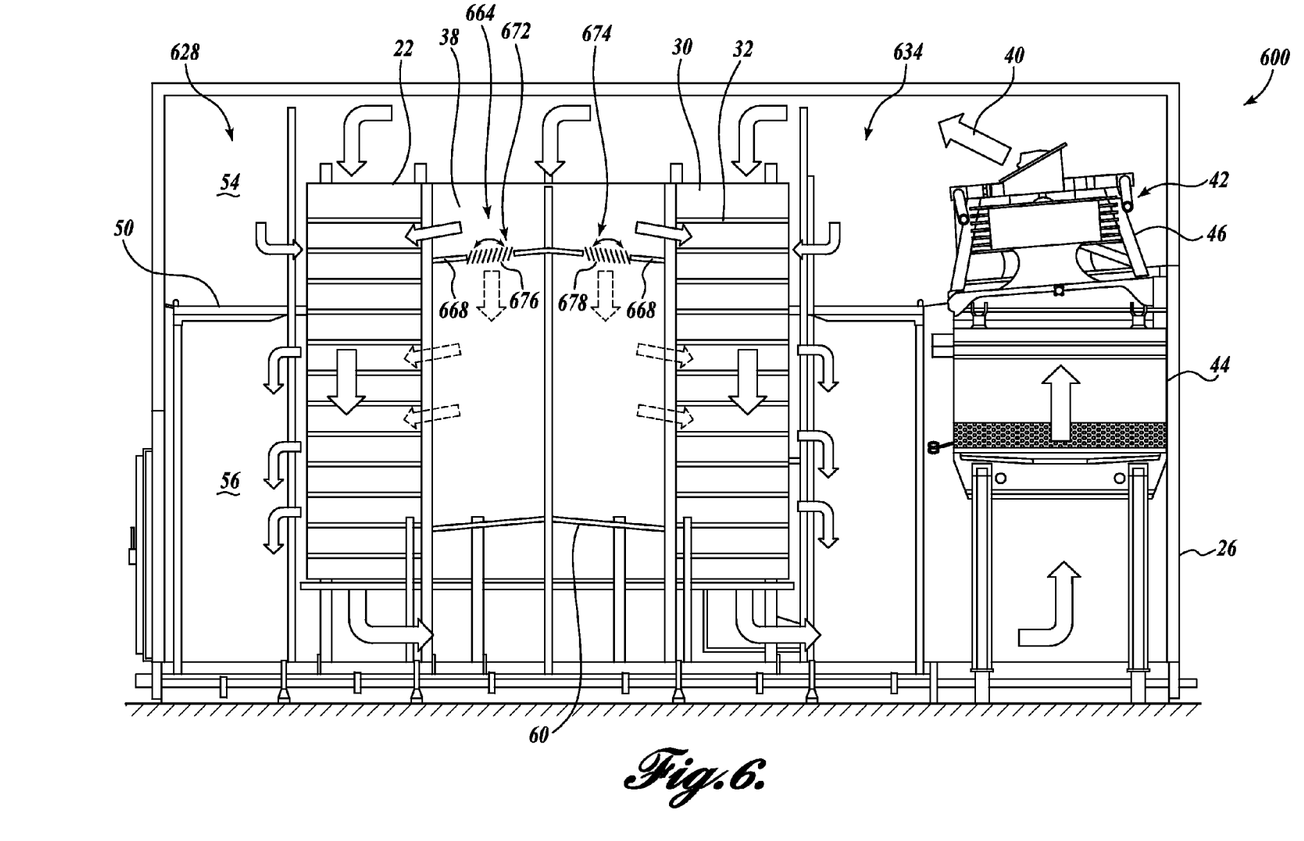
FIG. 6 is a cross-sectional view of a freezer system including a spiral stack in a freezer chamber and a gas circulation system having an adjustable flow path modification assembly for the freezer chamber formed in accordance with a fifth exemplary embodiment of the present disclosure, wherein a typical gas flow pattern within the freezer chamber is depicted.

Referring to FIG. 6, a freezer system 600 includes a gas circulation system 634 with an adjustable flow path modification assembly 628 defined in part by an upper internal sheeting assembly 664. The upper internal sheeting assembly 664 includes first and second adjustable openings 672 and 674 defined in part by first and second through-holes within an upper internal sheeting 668. Similar to the embodiment shown in FIG. 3, the first and second adjustable openings 672 and 674 are substantially similar in size, shape, and configuration, although the size, shape, and configuration may be varied to optimize the freezer configuration.

The first and second adjustable openings 672 and 674 are also symmetrically defined on first and second portions of the upper internal sheeting 668 (about a center of the substantially circular sheeting 668), although the pattern of openings may also be varied for optimization. In that regard, third and fourth adjustable openings (not shown) may be defined on third and fourth portions of the upper internal sheeting 668.

The adjustable openings 672 and 674 are further defined by first and second vents 676 and 678 disposed within the first and second through-holes in the upper internal sheeting assembly 664. The vents 676 and 678 may be configured to be at least partially opened or closed to allow or prevent treatment gas 40 to flow through the upper internal sheeting assembly 664. The first and second vents 676 and 678 may be biased into a closed position by a biasing member, such as a spring (not shown), and/or securable in a closed position by a lock or other suitable mechanism (not shown). In addition, the first and second vents 676 and 678 may be opened and closed by any suitable means, such as manually or by a suitable electrical or electromechanical switch.

One or both of the vents 676 and 678 may be at least partially closed to increase the radial flow of treatment gas 40 across the upper portion of the stack 22 (and decrease the vertical downward flow through the inner cylindrical channel 38). As stated above with respect to FIG. 2, such a configuration may be desired if the products on the exterior portion of the conveyor belt 30 are warmer than the products on the interior portion of the belt 30. Moreover, to optimize the flow of treatment gas 40, one or both of the vents 676 and 678 may be at least partially opened to allow at least some vertical downward flow of treatment gas 40 through the inner cylindrical channel 38 and to decrease the radial flow of treatment gas 40 across the upper portion of the stack 22.

Figure 7:
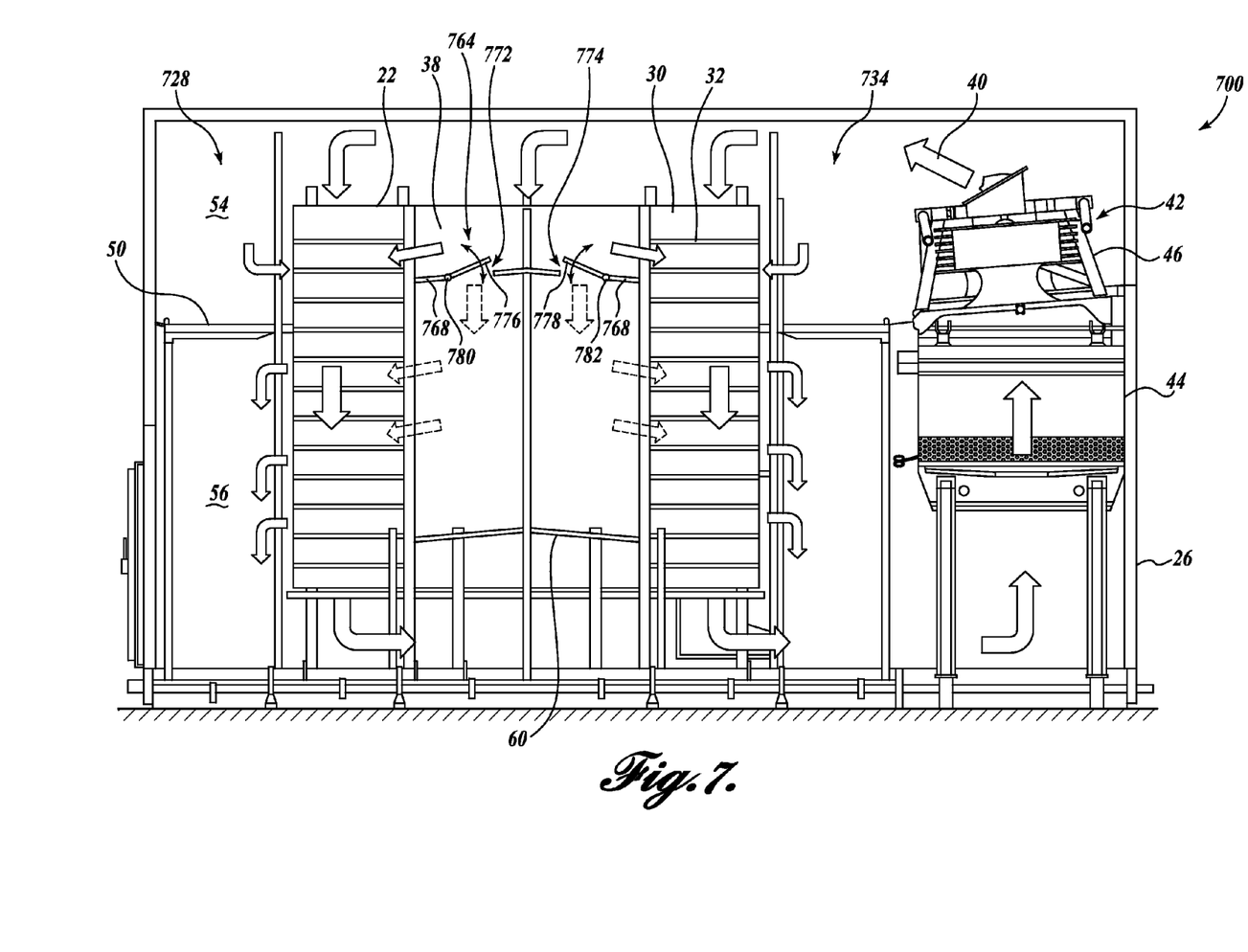
FIG. 7 is a cross-sectional view of a freezer system including a spiral stack in a freezer chamber and a gas circulation system having an adjustable flow path modification assembly for the freezer chamber formed in accordance with a sixth exemplary embodiment of the present disclosure, wherein a typical gas flow pattern within the freezer chamber is depicted.

Referring to FIG. 7, a freezer system 700 includes a gas circulation system 734 with an adjustable flow path modification assembly 728 defined in part by an upper internal sheeting assembly 764. The upper internal sheeting assembly 764 includes first and second adjustable openings 772 and 774 defined in part by first and second through-holes within an upper internal sheeting 768. Similar to the embodiment shown in FIG. 3, the first and second adjustable openings 772 and 774 are substantially similar in size, shape, and configuration, although the size, shape, and configuration may be varied to optimize the freezer configuration.

The first and second adjustable openings 772 and 774 are also symmetrically defined on first and second portions of the upper internal sheeting 768 (about a center of the substantially circular sheeting 768), although the pattern of openings may also be varied for optimization. In that regard, third and fourth adjustable openings (not shown) may be defined on third and fourth portions of the upper internal sheeting 768.

The adjustable openings 772 and 774 further include first and second doors 776 and 778 configured to selectively enclose the first and second through-holes in the upper internal sheeting 768. The doors 776 and 778 may be configured to be at least partially opened or closed to allow or prevent treatment gas 40 to flow through the upper internal sheeting assembly 764. The first and second doors 776 and 778 may be moveably connected to the upper internal sheeting 768 through first and second hinges 780 and 782, respectively. Moreover, the first and second doors 776 and 778 may be biased into a closed position by a biasing member, such as a spring (not shown), and/or securable in a closed position by a lock or other suitable mechanism (not shown). In addition, the first and second doors 776 and 778 can be opened and closed manually or by suitable electrical or electromechanical means (not shown).

One or both of the doors 776 and 778 may be at least partially closed to increase the radial flow of treatment gas 40 across the upper portion of the stack 22 (and decrease the vertical downward flow through the inner cylindrical channel 38). As stated above with respect to FIG. 2, such a configuration may be desired if the products on the exterior portion of the conveyor belt 30 are warmer than the products on the interior portion of the belt 30. Moreover, to optimize the flow of treatment gas 40, one or both of the first and second doors 776 and 778 may be at least partially opened to allow at least some vertical downward flow of treatment gas 40 through the inner cylindrical channel 38 and to decrease the radial flow of treatment gas 40 across the upper portion of the stack 22.

Figure 8:
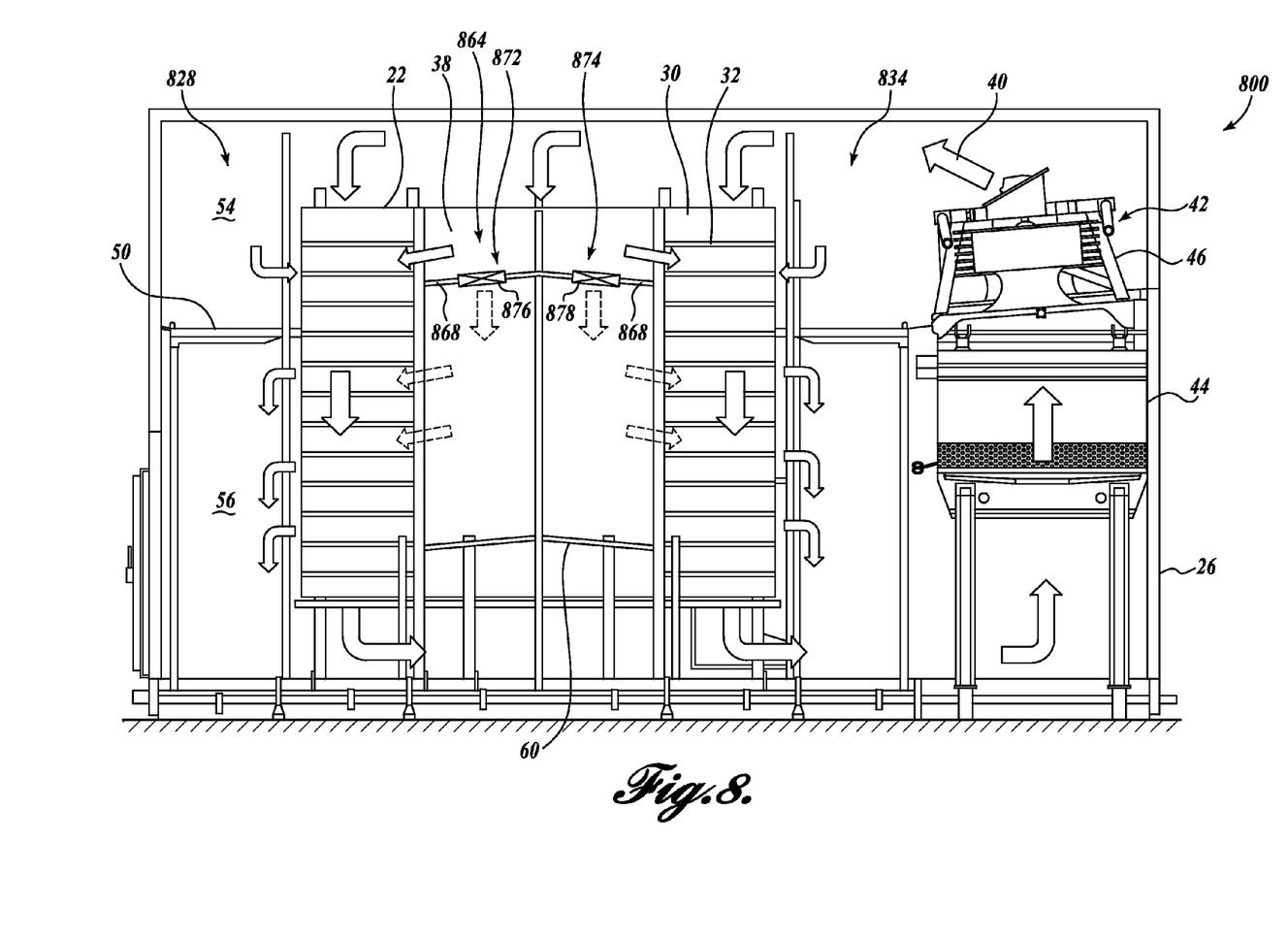
FIG. 8 is a cross-sectional view of a freezer system including a spiral stack in a freezer chamber and a gas circulation system having an adjustable flow path modification assembly for the freezer chamber formed in accordance with a seventh exemplary embodiment of the present disclosure, wherein a typical gas flow pattern within the freezer chamber is depicted.

Referring to FIG. 8, a freezer system 800 includes a gas circulation system 834 with an adjustable flow path modification assembly 828 defined in part by an upper internal sheeting assembly 864. The upper internal sheeting assembly 864 includes first and second adjustable openings 872 and 874 defined within an upper internal sheeting 868. Similar to the embodiment shown in FIG. 3, the first and second adjustable openings 872 and 874 are substantially similar in size and shape, although the size and shape may be varied to optimize the freezer configuration.

The first and second adjustable openings 872 and 874 are also symmetrically defined on first and second portions of the upper internal sheeting 868 (about a center of the substantially circular sheeting 868), although the pattern of openings may also be varied for optimization. In that regard, third and fourth adjustable openings (not shown) may be defined on third and fourth portions of the upper internal sheeting 868.

The adjustable openings 872 and 874 are further defined by first and second valves 876 and 878 disposed within the first and second through-holes in the upper internal sheeting 868. The valves 876 and 878 may be configured to be at least partially opened or closed to allow or prevent treatment gas 40 to flow through the upper internal sheeting assembly 864. Any suitable valves may be used. For instance, one or both of the valves 876 and 878 may comprise a pinch valve, a disc valve, a ball-check valve, or any other suitable valve. Moreover, the first and second valves 876 and 878 may be opened and closed manually or by suitable electrical or electromechanical means (not shown).

One or both of the valves 876 and 878 may be closed to increase the radial flow of treatment gas 40 across the upper portion of the stack 22 (and decrease the vertical downward flow through the inner cylindrical channel 38). As stated above with respect to FIG. 2, such a configuration may be desired if the products on the exterior portion of the conveyor belt 30 are warmer than the products on the interior portion of the belt 30. Moreover to optimize the flow of treatment gas 40, one or both of the valves 876 and 878 may be at least partially opened to allow at least some vertical downward flow of treatment gas 40 through the inner cylindrical channel 38 and to decrease the radial flow of treatment gas 40 across the upper portion of the stack 22.

While illustrative embodiments have been illustrated and described, it will be appreciated that various changes can be made therein without departing from the spirit and scope of the present disclosure.

The embodiments of the present disclosure in which an exclusive property or privilege is claimed are defined as follows:

1. An adjustable flow path modification assembly for use with a gas treatment system having a spiral stack and a gas treatment supply unit disposed within a chamber, the spiral stack having a height extending between a first end and a second end of the stack and an inner channel, the assembly comprising:
   (a) a first internal partition disposed within the inner channel of the stack and located at a height of the stack that is spaced from the first end of the stack;
   (b) a second internal partition disposed within the inner channel of the stack;
   (c) an external partition fitted between the spiral stack and the chamber, wherein the external partition is positioned at a height of the stack between the first internal partition and the second internal partition; and
   (d) an adjustable opening defined within the first internal partition, wherein the adjustable opening is configured to be arranged in a closed position, where no treatment gas may flow through the inner channel of the stack through the adjustable opening, an open position, where a maximum amount of treatment gas may flow through the inner channel of the stack through the adjustable opening, and a partially opened position, where a selective amount of treatment gas may flow through the inner channel of the stack through the adjustable opening.

2. The assembly of claim 1, wherein the second internal partition is located at a height of the stack that is spaced from the second end of the stack.

3. The assembly of claim 2, wherein the second internal partition is at a height of the stack below the first internal partition.

4. The assembly of claim 1, wherein the gas treatment supply unit directs treatment gas toward the first end of the spiral stack.

5. The assembly of claim 1, wherein the adjustable opening is defined by a through-hole in the first internal partition that is selectively coverable.

6. The assembly of claim 5, wherein the through-hole is selectively coverable by one of a partition piece, a valve, a vent, a door, and any combination thereof.

7. The assembly of claim 1, further comprising a plurality of adjustable openings defined within the first internal partition, wherein each of the plurality of adjustable openings may be configured to selectively allow the flow of treatment gas through the inner channel of the stack.

8. A method of adjusting the flow of treatment gas within a gas treatment system having a spiral stack and a gas treatment supply unit disposed within a chamber, the spiral stack having a height extending between a first end and a second end of the stack and an inner channel, the method comprising:
  (a) providing an adjustable flow path modification assembly, comprising:
    (i) a first internal partition disposed within the inner channel of the stack and located at a height of the stack that is spaced from the first end of the stack;
    (ii) a second internal partition disposed within the inner channel of the stack;
    (iii) an external partition fitted between the spiral stack and the chamber, wherein the external partition is positioned at a height of the stack between the first internal partition and the second internal partition; and
    (iv) an adjustable opening defined within the first internal partition;
  (b) configuring the adjustable opening to allow an increased flow of treatment gas through the inner channel of the stack;
  (c) circulating treatment gas toward the first internal partition such that at least some treatment gas flows radially outwardly across the first internal partition and a first portion of the spiral stack, and at least some treatment gas flows into the inner channel of the stack through the adjustable opening and radially outwardly from the inner channel across a second portion of the spiral stack when the adjustable opening is at least partially opened; and
  (d) reducing the flow of treatment gas through the adjustable opening and into the inner channel of the stack to decrease the flow of treatment gas radially outwardly from the inner channel across the spiral stack.

9. The method of claim 8, further comprising circulating treatment gas substantially radially outwardly across the second partition and a second portion of the stack.

10. The method of claim 9, wherein the external partition divides the chamber into a higher pressure atmospheric zone and a lower pressure atmospheric zone, and wherein the method further comprises circulating treatment gas such that at least some treatment gas flows from the higher pressure atmospheric zone to the lower pressure atmospheric zone.

11. An adjustable flow path modification assembly for use with a gas treatment system having a spiral stack and a gas treatment supply unit disposed within a chamber, the spiral stack having a height extending between a first end and a second end of the stack and an inner channel, the assembly comprising:
  (a) a first internal partition disposed within the inner channel of the stack and located at a height of the stack that is spaced from the first end of the stack;
  (b) a second internal partition disposed within the inner channel of the stack and located at a height of the stack that is spaced from the second end of the stack;
  (c) an external partition fitted between the spiral stack and the chamber, wherein the external partition is positioned at a height of the stack between the first internal partition and the second internal partition; and
  (d) an adjustable opening defined within the first internal partition such that at least some treatment gas is configured to flow radially outwardly across the first internal partition and a first portion of the spiral stack, and at least some of treatment gas is configured to flow into the inner channel of the stack through the adjustable opening and radially outwardly from the inner channel across a second portion of the spiral stack.

12. The assembly of claim 11, wherein the gas treatment supply unit directs treatment gas toward the first end of the spiral stack.

13. The assembly of claim 11, wherein the adjustable opening is defined by a through-hole in the first internal partition that is selectively coverable.

14. The assembly of claim 13, wherein the through-hole is selectively coverable by one of a partition piece, a valve, a vent, a door, and any combination thereof.

15. The assembly of claim 11, further comprising a plurality of adjustable openings defined within the first internal partition, wherein each of the plurality of adjustable openings may be configured to selectively allow the flow of treatment gas through the inner channel of the stack.

16. An adjustable flow path modification assembly for use with a gas treatment system having a spiral stack and a gas treatment supply unit disposed within a chamber, the spiral stack having a height extending between a first end and a second end of the stack and an inner channel, the assembly comprising:
  (a) a first internal partition disposed within the inner channel of the stack and located at a height of the stack that is spaced from the first end of the stack;
  (b) a second internal partition disposed within the inner channel of the stack and located at a height of the stack that is spaced from the second end of the stack;
  (c) an external partition fitted between the spiral stack and the chamber, wherein the external partition is positioned at a height of the stack between the first internal partition and the first end of the stack; and
  (d) an adjustable opening defined within the first internal partition such that at least some treatment gas is configured to flow radially outwardly across the first internal partition and a first portion of the spiral stack, and at least some of treatment gas is configured to flow into the inner channel of the stack through the adjustable opening and radially outwardly from the inner channel across a second portion of the spiral stack.

17. The assembly of claim 16, wherein the gas treatment supply unit directs treatment gas toward the first end of the spiral stack.

18. The assembly of claim 16, wherein the adjustable opening is defined by a through-hole in the first internal partition that is selectively coverable.

19. The assembly of claim 18, wherein the through-hole is selectively coverable by one of a partition piece, a valve, a vent, a door, and any combination thereof.

20. The assembly of claim 16, further comprising a plurality of adjustable openings defined within the first internal partition, wherein each of the plurality of adjustable openings may be configured to selectively allow the flow of treatment gas through the inner channel of the stack.

* * * * *